June 16, 1953     E. THALMANN     2,642,016

DIE-HEAD GASKET FOR SPAGHETTI EXTRUSION PRESSES

Filed Feb. 21, 1951

INVENTOR:

Emil Thalmann

By
his Attorney

Patented June 16, 1953

2,642,016

UNITED STATES PATENT OFFICE 2,642,016

DIE-HEAD GASKET FOR SPAGHETTI EXTRUSION PRESSES

Emil Thalmann, Kobel, Uzwil, Switzerland, assignor to Gebruder Buhler, Uzwil, Switzerland Application February 21, 1951, Serial No. 212,036
In Switzerland March 28, 1950

1 Claim. (Cl. 107—14)

In the production of spaghetti and the like by means of an extrusion press, the dough is extruded through a die, the apertures in the latter imparting the desired cross-section to the outgoing dough strings.

The extrusion dies have to be readily interchangeable and be sealed against relatively high dough pressure. The dies are firmly pressed against the die head in order to attain a metal-to-metal seal. For such purpose, metallic gaskets have been put on the dies.

Such solutions, however, only are satisfactory when the dies are perfectly clean and when the contact faces of dies and gaskets are not damaged in any way. The said faces, however, are liable to be readily damaged in the course of inevitable handling and manipulating.

Such disadvantages are avoided by the gasket disclosed in my present application, in that the gasket is elastic and supported on seating surfaces of the die and head and is prevented from being pushed out by internal pressure.

Two forms of my present invention are shown by way of example in the accompanying drawing, in which.

Figure 1:
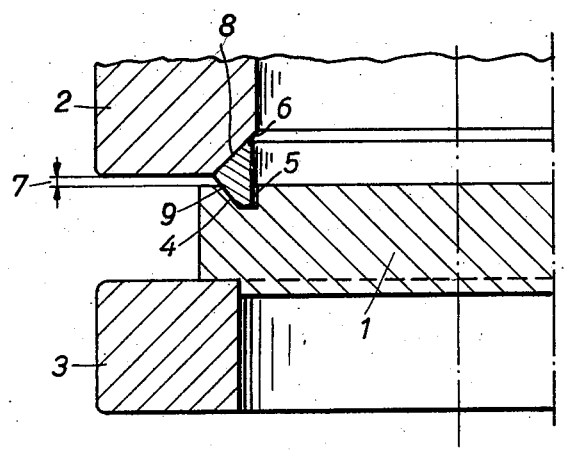
Fig. 1 shows a fragmentary cross-section through a first.

The die illustrated in the drawing has holes between the gaskets, the section line used avoiding the interception of any holes.

In Fig. 1, numeral 1 designates the die, 2 the die head, 3 the die mount by which the die is pressed against the head, and 4 the elastic gasket. The latter on one hand is loosely positioned in a groove 5 of die 1 and, on the other hand, abuts against the face 6 of head 2. The gasket thus comprises an external portion defined by two faces 8 and 9 which run together and are parallel to or concentric with said face 6 and the external wall of groove 5 in die 1 respectively.

Of greater importance, however, is the fact that the gap 7 between head 2 and die 1 is kept at a minimum so that the gasket 4 cannot be pushed out under the high internal pressure to which it is exposed.

Figure 2:
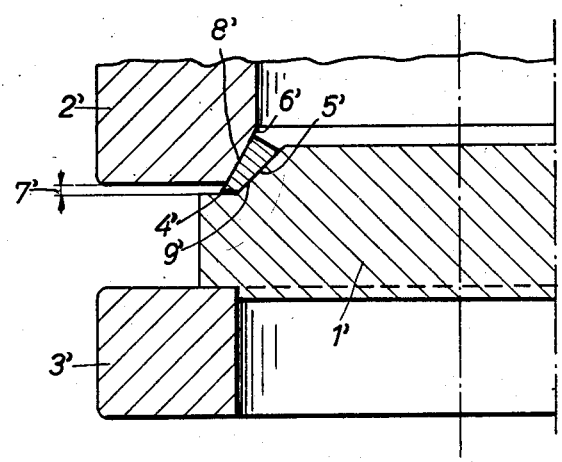
Fig. 2 is a similar cross-section through a second form.

In the form of invention shown in Fig. 2, the gasket 4' is of wedge shape in cross-section, the sides 8' and 9' of the wedge bearing on the faces 6' of head 2' and 5' of die 1' respectively, and the said faces having the same inclination as the said sides respectively. The gap 7' formed between head 2' and die 1' is so small that the gasket 4' cannot be blown out by the internal pressure.

What I claim as new and desire to secure by Letters Patent, is:

In a spaghetti extrusion press comprising an annular extrusion die having a stepped top rim which defines a first sloped face and a horizontal seat, a die mount, an annular die head subjected to the full internal pressure and having a beveled lower internal edge opposite the said beveled edge defining a second sloped face, said first and second sloped faces converging downwardly, and each forming an acute angle with the horizontal, and a resilient annular gasket seated on said first and second sloped faces, having sides sloping downwardly and outwardly, converging outwardly in cross-section so as to fit the said first and second sloping faces, said gasket extending below the first sloped face to said horizontal seat, forming a gap between said die and die head of such size less than any depth of the gasket to prevent the gasket from being blown out through the gap by the internal pressure in the head.

EMIL THALMANN.

References Cited in the file of this patent

UNITED STATES PATENTS

| Number | Name | Date |
|---|---|---|
| 1,724,545 | Ambrette | Aug. 13, 1949 |

FOREIGN PATENTS

| Number | Country | Date |
|---|---|---|
| 537,698 | France | Mar. 8, 1922 |